United States Patent [19]
Goeppel et al.

[11] Patent Number: 5,440,754
[45] Date of Patent: Aug. 8, 1995

[54] WORK STATION AND METHOD FOR TRANSFERRING DATA BETWEEN AN EXTERNAL BUS AND A MEMORY UNIT

[75] Inventors: Anton Goeppel, Burgau, Germany; Edward C. King, Fremont, Calif.

[73] Assignee: NCR Corporation, Dayton, Ohio

[21] Appl. No.: 752,407

[22] Filed: Aug. 30, 1991

[30] Foreign Application Priority Data

Aug. 31, 1990 [GB] United Kingdom ............... 9019023

[51] Int. Cl.[6] ............................................. G06F 13/00
[52] U.S. Cl. ..................................... 395/800; 395/275;
395/550; 395/325; 395/858; 395/287; 395/306;
364/238; 364/238.2; 364/283.3; 364/283.9;
364/DIG. 1
[58] Field of Search ............... 395/800, 275, 550, 425,
395/250, 325; 364/DIG. 1, DIG. 2, 238

[56] References Cited

U.S. PATENT DOCUMENTS

| | | | |
|---|---|---|---|
| 4,851,990 | 7/1989 | Johnson et al. | 395/325 |
| 4,965,717 | 10/1990 | Cutts, Jr. et al. | 395/575 |
| 5,025,366 | 6/1991 | Baror | 395/425 |
| 5,029,124 | 7/1991 | Leahy et al. | 395/325 |
| 5,051,985 | 9/1991 | Cidon et al. | 370/85.5 |
| 5,068,781 | 11/1991 | Gillett et al. | 395/325 |
| 5,159,672 | 10/1992 | Salmon et al. | 395/325 |
| 5,191,657 | 3/1993 | Ludwig et al. | 395/325 |
| 5,228,134 | 7/1993 | MacWilliams et al. | 395/425 |
| 5,237,567 | 8/1993 | Nay et al. | 370/85.1 |
| 5,237,670 | 8/1993 | Wakerly | 395/425 |
| 5,243,703 | 9/1993 | Farmwald et al. | 395/325 |

FOREIGN PATENT DOCUMENTS

| | | |
|---|---|---|
| 0165600 | 12/1985 | European Pat. Off. . |
| 0303751 | 2/1989 | European Pat. Off. . |
| 9000284 | 1/1990 | WIPO . |

OTHER PUBLICATIONS

Jeff Fried, "A VLSI Chip Set for Burst and Fast ATM Switching", IEEE 1989, pp. 128-135.

Bond, John; "Bus Master Interface Chips Boost MCA Transfer Rate", Computer Design, Jan. 1, 1990, vol. 29, No. 1, pp. 36 and 38.

*Primary Examiner*—Alyssa H. Bowler
*Assistant Examiner*—Dzung C. Nguyen
*Attorney, Agent, or Firm*—James H. Beusse

[57] ABSTRACT

A work station connected to an asynchronous bus for transferring a starting address and consecutive data elements. The work station includes a CPU and memory unit, and an interface circuit connected between the bus and CPU. It also includes synchronous bus connecting the interface circuit, CPU and memory unit, and a system clock defining consecutive time slots and connected to the circuit. The circuit controls the synchronous bus transfer of the address in a first time slot and consecutive data elements in consecutive time slots.

17 Claims, 11 Drawing Sheets

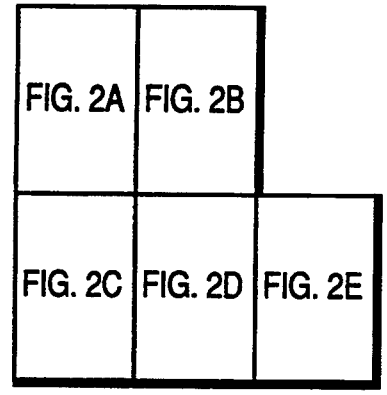
FIG. 2
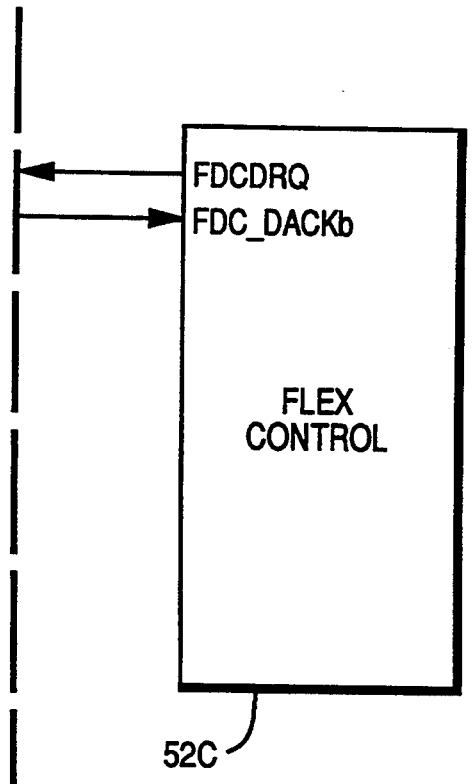
FIG. 2E
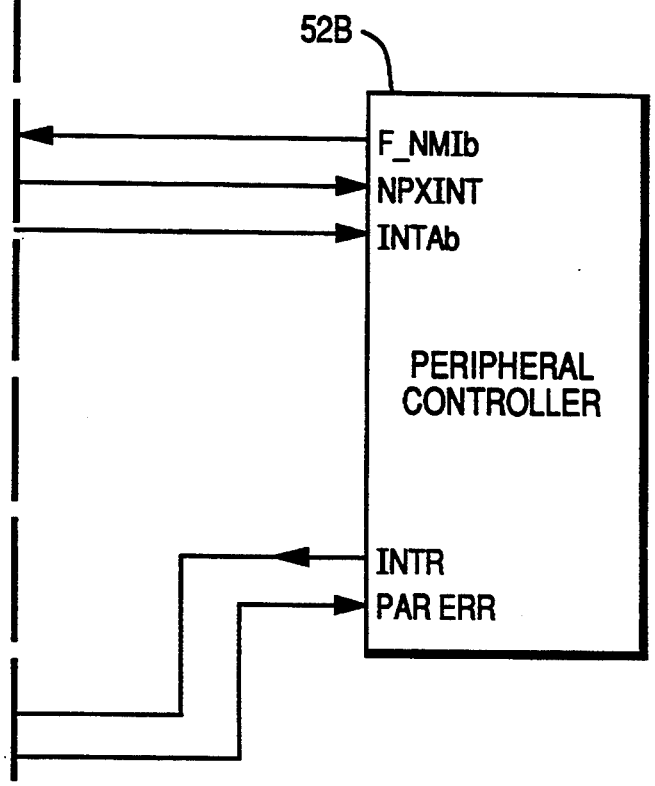

FIG. 6A

BIB ASIC  
( PIN ASSIGNMENT )

Top (left to right, pins 207–182):
207 VCC14, 206 GND15, 205 TEST, 204 SDR(1), 203 SDR(0), 202 SDSTROBE, 201 MSDRb, 200 GND14, 199 DPAR(3), 198 DPAR(2), 197 DPAR(1), 196 DPAR(0), 195 DPARENb, 194 APAR(3), 193 VCC13, 192 APAR(2), 191 APAR(1), 190 APAR(0), 189 APARENb, 188 MCREFRESHb, 187 TCb, 186 GND13, 185 MCBURSTb, 184 PREEMPTb, 183 ARB(3), 182 VCC12

Left (pins 1–52):
1 LEBAb
2 GABb
3 GBAb
4 GDb
5 DIR
6 D(0)
7 D(1)
8 AD(2)
⋮
19 AD(13)
20 GND1
21 AD(14)
⋮
26 AD(19)
27 VCC1
28 AD(20)
⋮
33 AD(25)
34 GND2
35 AD(26)
⋮
40 AD(31)
41 VCC2
42 BEb(0)/A0
43 BEb(1)/A1
44 BEb(2)/BHEb
45 BEb(3)
46 ADSb
47 M_IOb
48 GND3
49 D_Cb
50 W_Rb
51 PCLK
52 RDYBLb Bottom (pins 53–78):
53 BRDYBLb, 54 BLASTb, 55 VCC3, 56 RESET, 57 RDYb, 58 BRDYb, 59 CT(0), 60 CT(1), 61 SBURSTb, 62 GND4, 63 BREQb, 64 BGNTb, 65 CIN, 66 CSETUPb, 67 REFb, 68 COUT, 69 VCC4, 70 NMI, 71 NMIBL, 72 LOCKb, 73 A20G, 74 KENBLb, 75 BOFFBLb, 76 GND5, 77 REFREQb, 78 FDCDRQ

FIG. 6B

BIB ASIC (PIN ASSIGNMENT)

Top edge (left to right):
- ARB(2) — 181
- ARB(1) — 180
- ARB(0) — 179
- ARB_GNT — 178
- SYSFDBK — 177
- TR32 — 176
- GND12 — 175
- SYSRDYb — 174
- SYSDS16b — 173
- SYSDS32b — 172
- CHRDYRTN — 171
- DS32RTN — 170
- DS16RTN — 169
- VCC11 — 168
- S1b — 167
- GND11 — 166
- S0b — 165
- MCM_IOb — 164
- MADE24 — 163
- SBHEb — 162
- ALDb — 161
- VCC10 — 160
- MCBEb(3) — 159
- MCBEb(2) — 158
- MCBEb(1) — 157

Right edge (top to bottom):
- MCBEb(0) — 156
- MCD(31) — 155
- MCD(30) — 154
- GND10 — 153
- MCD(29) — 152
- ⋮
- MCD(24) — 147
- VCC9 — 146
- MCD(23) — 145
- ⋮
- MCD(18) — 140
- GND9 — 139
- MCD(17) — 138
- ⋮
- MCD(12) — 133
- VCC8 — 132
- MCD(11) — 131
- ⋮
- MCD(6) — 126
- GND8 — 125
- MCD(5) — 124
- ⋮
- MCD(0) — 119
- VCC7 — 118
- MCA(31) — 117
- ⋮
- MCA(20) — 106
- GND7 — 105

Bottom edge (left to right):
- FDCDACKb — 79
- MCLK — 80
- CLKSEL — 81
- MCA(0) — 82
- VCC5 — 83
- MCA(1) — 84
- MCA(2) — 85
- MCA(3) — 86
- MCA(4) — 87
- MCA(5) — 88
- MCA(6) — 89
- GND6 — 90
- MCA(7) — 91
- MCA(8) — 92
- MCA(9) — 93
- MCA(10) — 94
- MCA(11) — 95
- MCA(12) — 96
- VCC6 — 97
- MCA(13) — 98
- MCA(14) — 99
- MCA(15) — 100
- MCA(16) — 101
- MCA(17) — 102
- MCA(18) — 103
- MAC(19) — 104

WORK STATION AND METHOD FOR TRANSFERRING DATA BETWEEN AN EXTERNAL BUS AND A MEMORY UNIT

The present invention relates to a work station or similar data processing system of the kind including a central processing unit (CPU) communicating with various external units such as memories, microchannel bus, etc. More particularly, it relates to a work station having the capability of direct data transfer between such external units.

CROSS-REFERENCE TO RELATED APPLICATIONS

"Work Station Having Multiprocessing Capability", Ser. No. 07/752,747, filed Aug. 30, 1991, invented by Otto Duerrschmid and Edward C. King.

"Work Station or Similar Data Processing System Including Interfacing Means to Microchannel Means", Ser. No. 07/752,710, filed Aug. 30, 1991, invented by V. Thomas Powell, Anton Goeppel, Edward C. King and G. Roerhl.

"Work Station Including a Direct Memory Access Controller and Interfacing Means to Microchannel Means", Ser. No. 07/753,273, filed Aug. 30, 1991, invented by Georg Dollinger and Edward C. King.

"Work Station and Method for Configuring Thereof", Ser. No. 07/752,814, filed Aug. 30, 1991, invented by Anton Goeppel.

"Work Station Interfacing Means Having Burst Mode Capability", Ser. No. 07/752,383, filed Aug. 30, 1991, invented by Edward C. King and Anton Goeppel.

"Internal Bus for Work Station Interfacing Means", Ser. No. 07/752,371, filed Aug. 30, 1991, invented by Edward C. King and Anton Goeppel.

"Work Station Architecture With Selectable CPU", Ser. No. 07/752,819, filed Aug. 30, 1991, invented by Edward C. King and Anton Goeppel.

"Register Control for Workstation Interfacing Means", Ser. No. 07/752,727, filed Aug. 30, 1991, invented by Anton Goeppel.

"Work Station Including a Direct Memory Access Controller", Ser. No. 07/752,815, filed Aug. 30, 1991, invented by Anton Goeppel.

BACKGROUND OF THE INVENTION

Known work stations use a specific CPU, e.g., an Intel 80386 microprocessor provided on a system board together with other chip units such as memories, various peripheral interfaces and a system bus controller. The CPU and the above mentioned units communicate with each other, partially through buffers, over a local bus comprising control, address and data lines, all units being under tight control of the CPU through the local bus. In general, the system design is tailored for the specific CPU. This means that a large variety of different chip units are required for work stations using different CPUs. The local bus also is tailored for the specific configuration. In order to maintain compatibility with other systems, detailed specifications rigidly determine the features and functions of the various units and their I/O registers. Thus, it is difficult to modify the system for expansion and improved performance.

Many such work stations are designed to allow the direct transfer of data between the system memory and external devices, particularly external devices which are connected to an external or peripheral bus. With the recent availability of high performance peripheral busses, existing work stations are frequently unable to take full advantage of the available performance features. One such peripheral bus is a microchannel bus which defines an enhanced microchannel architecture (MCA). One feature of the enhanced microchannel architecture is a form of high speed data transfer referred to as "streaming mode", in which a starting address only is provided followed by consecutive data elements. In this manner, many data elements may be consecutively transferred without having to transmit an address for each element. A feature of streaming mode is that it is asynchronous, i.e., it is not tied to a clock, and very fast. For example, it has a maximum data rate of 80 MB/second.

In contrast, existing work stations operate in a synchronous environment, i.e. their operations are timed by a system clock. Furthermore, the time required to carry out transfers is frequently too slow to keep up with high performance external busses. For example, the normal transfer protocol supported by Intel processors requires at least two block cycles per transfer. Thus, such a work station which has a 20 MHZ CPU and a 32 bit (4 bytes) wide local bus can only transfer 40 MB/second.

A unique aspect of the present invention, described in more detail in some of the related applications referenced above, is the highly decentralized control of functions external to the CPU. This is achieved by the design of several integrated circuit chips to function, respectively, as intelligent interface units between the CPU and external devices such as a microchannel bus and system memory. The interface unit between the CPU and microchannel bus is referred to herein as the BIB (microchannel interface block). As will be discussed more fully, the BIB is largely autonomous of the CPU and performs a number of functions in relief of the CPU. For example, it is responsible for transfers of data between the memory and microchannel bus.

A problem which can arise in the design of a work station with an independent BIB relates to the number of external pins available on the BIB. The BIB provides numerous functions, many of which require communication with the CPU, microchannel bus and other external units. Increased functions place a high demand and competition for use of external pins on the BIB. It will be appreciated that the size of the chip is influenced directly by the number of pins. Because chip size is an important design consideration, the limitation of pin count is a highly desirable goal. One of the largest potential uses of external pins on the chip are address and data lines.

OBJECTS OF THE INVENTION

It is an object of the present invention to provide a system and method for the high speed transfer of data between an asynchronous external bus and a synchronous local bus of a work station.

It is another object of the present invention to provide a synchronous workstation capable of efficient transfer of streaming mode data from or to a microchannel bus.

It is a further object of the present invention to provide a method for the high speed transfer of data.

It is an yet object of the present invention to provide a work station having a CPU and multifunction interface unit between the CPU and an external device, in which the interface unit is formed on an integrated chip having a restricted number of pins.

It is still another object of the present invention to provide a work station and method for high speed data transfer between external devices through a chip which is largely autonomous of a CPU and which has a limited number of pins.

SUMMARY OF THE INVENTION

One form of the present invention is a work station having a central processing unit (CPU), memory unit, interface circuit and system clock, all connected by a local bus. The interface circuit is connected between an external bus and CPU, the external bus being connected to a device which controls an asynchronous transfer of a starting address and consecutive data elements to the external bus. The interface circuit enables data transfer between the bus and the memory unit. The system clock provides a timing signal to the CPU and interface circuit, the timing signal defining consecutive time slots, each time slot equal to a single clock cycle. The local bus includes a control line group for controlling the transfer of the address and consecutive data elements over the local bus in consecutive time slots.

In another embodiment of the present invention, the interface circuit is designed as a self-contained functional block formed as an integrated circuit chip and provided with a predetermined number of connecting pins, a group thereof being assigned for communicating either addresses or data. The local bus includes both an address line group and a data line group each corresponding in number to the group of connecting pins of the interface circuit. The work station further includes a multiplexer/demultiplexer connected on one side to the group of pins of the interface circuit and on the other side to both the address line group and the data line group.

Another form of the present invention is a method for a continuous data transfer between first and second units of a work station, the units being connected by a local bus. A timing signal defining consecutive single clock cycle time slots is generated on the local bus. A BURST signal is transmitted on the local bus from the first to second unit indicating a continuous data transfer. A LOCK signal is generated on the local bus for locking the bus for continuous data transfer. A starting address is presented on the bus by the first unit. Data is then provided in consecutive time slots from one of the units to the local bus, the data corresponding to the starting address and consecutive addresses. In addition, consecutive addresses are calculated in the unit receiving the data.

The work station of a preferred embodiment comprises highly integrated functional blocks provided with intelligence and each arranged on an integrated circuit chip. Each functional block serves as an active interface either for memory control (MIB), microchannel bus control (BIB) or local peripheral control (PIB). One or a plurality of MIBs or BIBs and one PIB communicate through a local bus with a selected CPU. The local bus is specifically extended as compared with the local bus of known work stations in order to provide more flexibility and improved performance. In particular the local bus according to a preferred embodiment of the invention comprises additional lines CT(0:1) for selecting the type of processor which has access to the local bus (host P/M bus). Additionally, with a preferred embodiment up to four MIBs or BIBs may reside on the host P/M bus using a corresponding request signal BREQb(0 . . . 3) and a corresponding grant signal BGNTb(0 . . . 3) which serve to select an active functional block. Since only BIBs may be bus masters, only they need a BREQb line. As noted above, the host P/M bus routes "burst" signals generated by one of the functional blocks (BIB) to the functional blocks (MIB or PIB). This is specifically applicable for a streaming mode in read/write operations between a microchannel and the memory where the BIB functional block assumes the role of a bus master sending data through the MIB functional unit to the memory.

One embodiment of the invention will now be described by way of example with reference to the accompanying drawings.

BRIEF DESCRIPTION OF THE DRAWINGS

FIGS. 2A, 2B, 2C, 2D and 2E are schematic diagrams showing in detail a host P/M bus as used to connect the various functional blocks with each other.

FIGS. 6A–6B are a plan view of a physical implementation of a BIB block.

DESCRIPTION OF A PREFERRED EMBODIMENT

Figure 1:
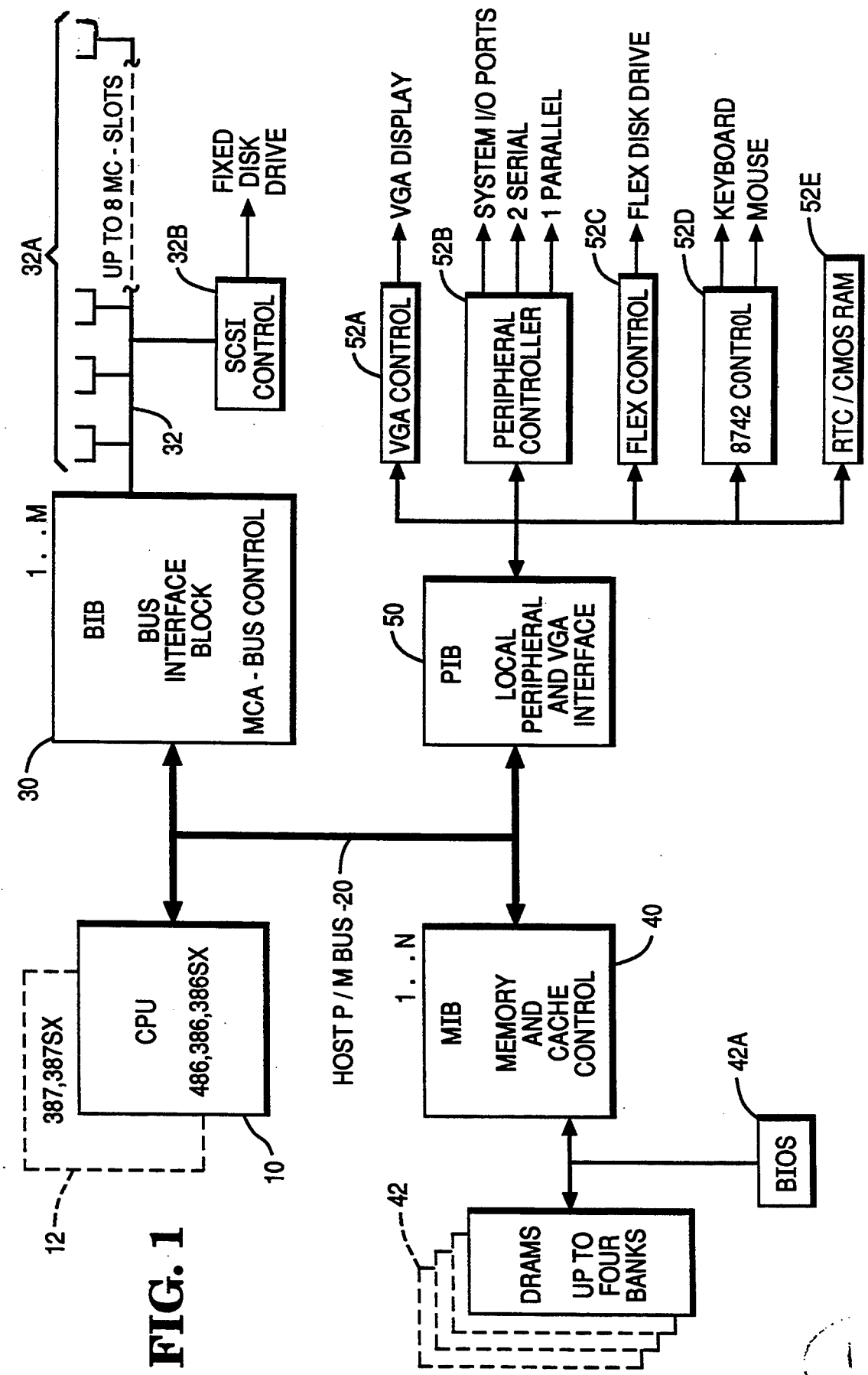
FIG. 1 is a schematic overall view of an embodiment of a work station according to the invention illustrating the various functional blocks and the connections therebetween.
Figure 2A:
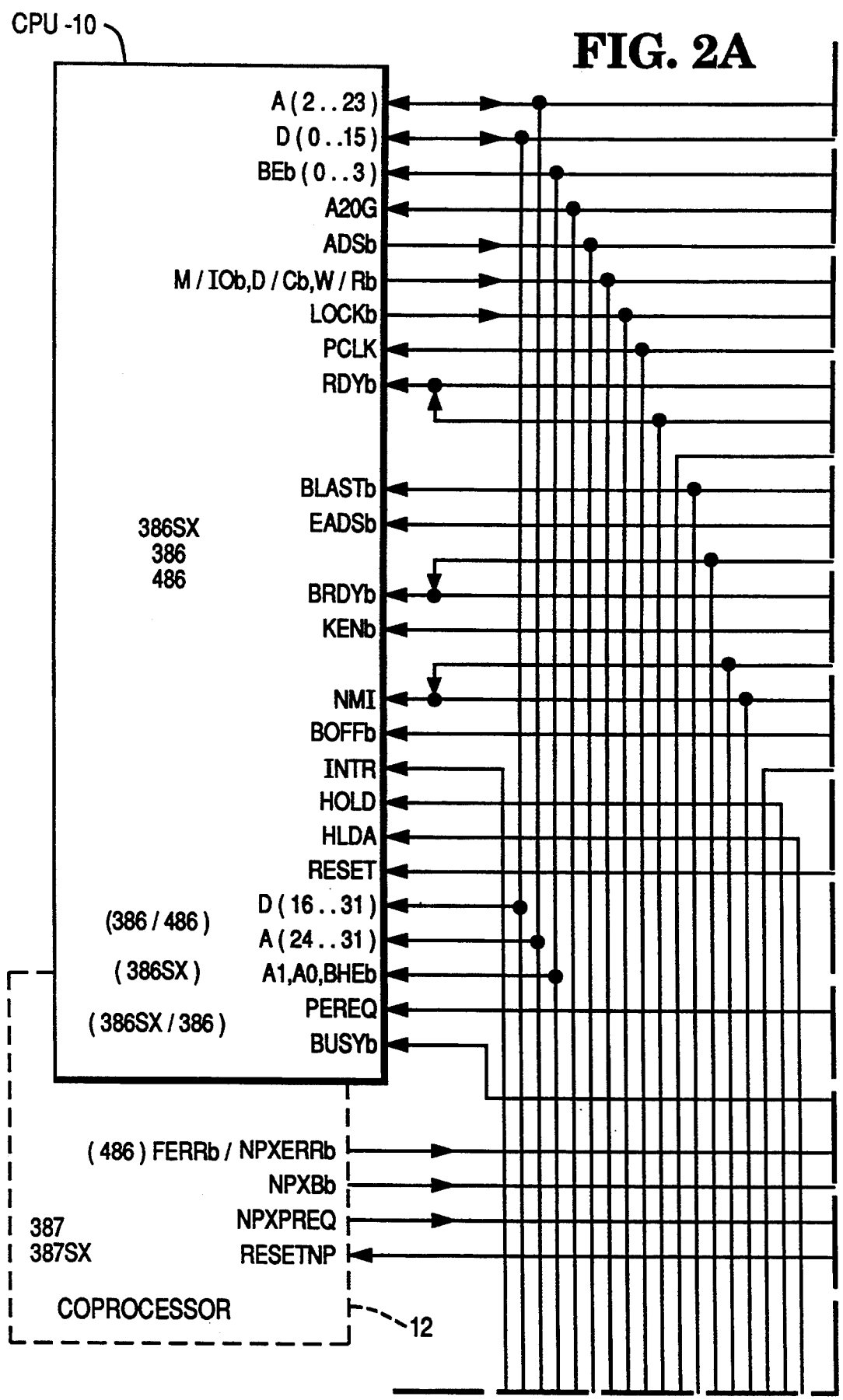
Figure 2B:
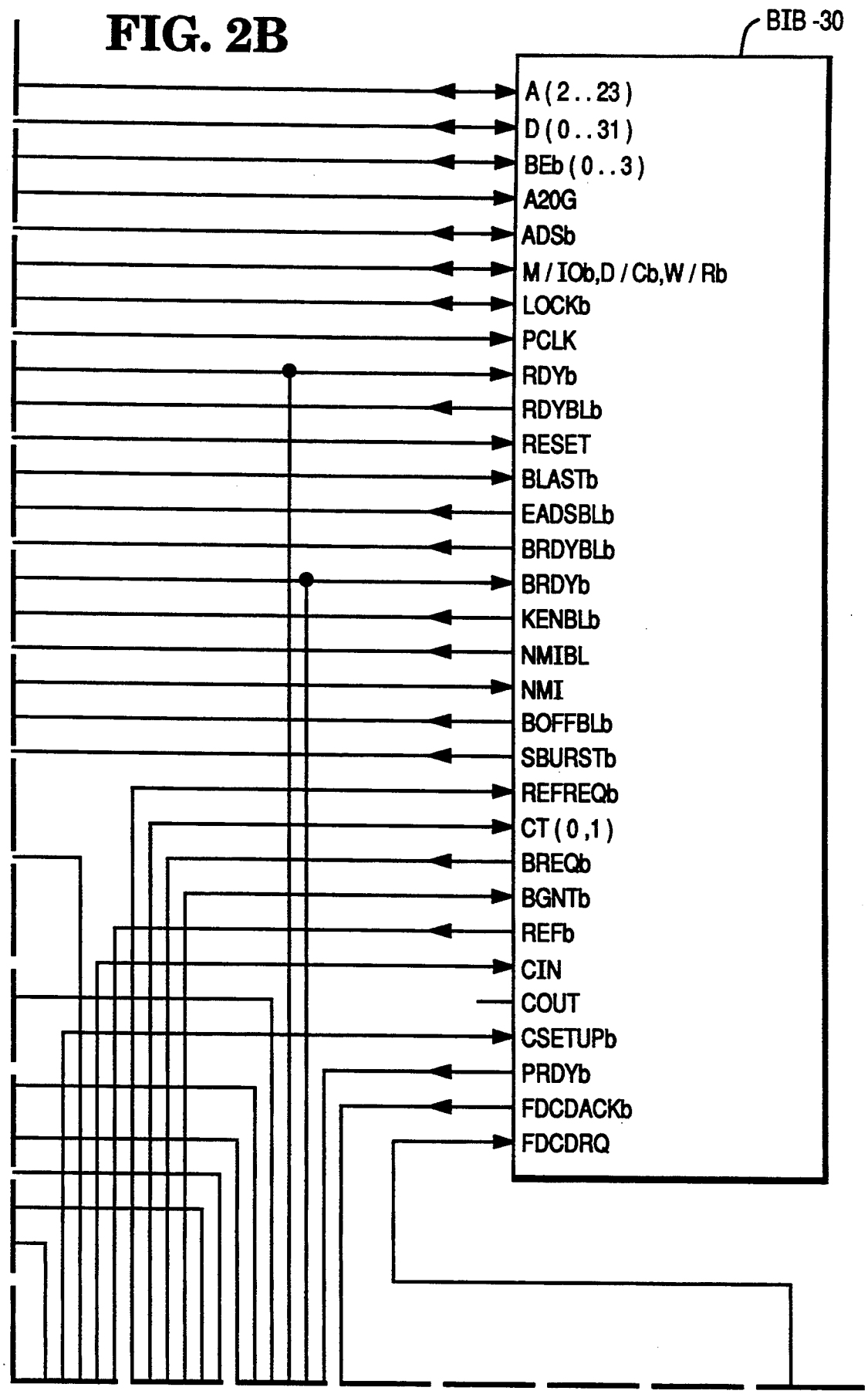
Figure 2C:
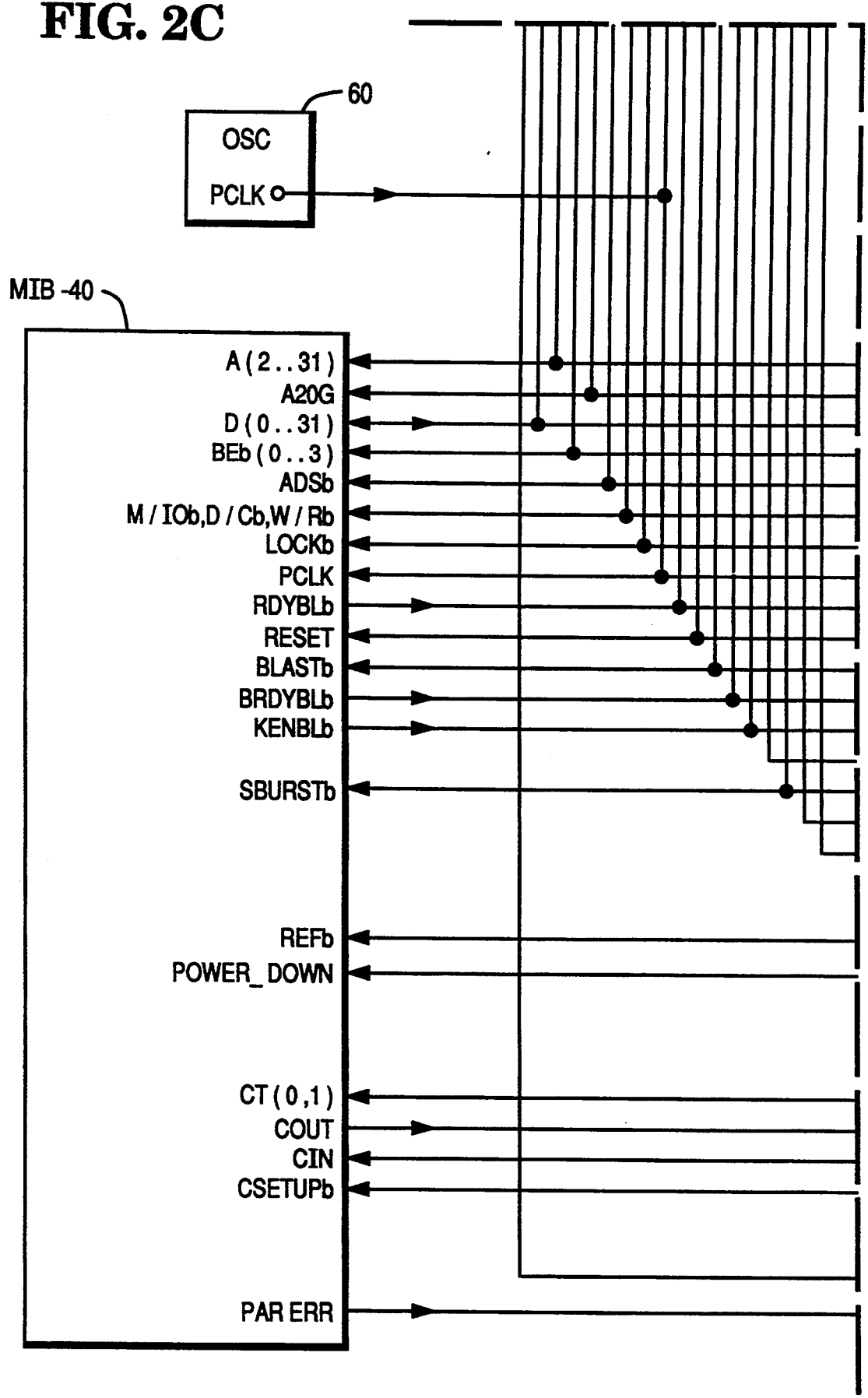
Figure 2D:
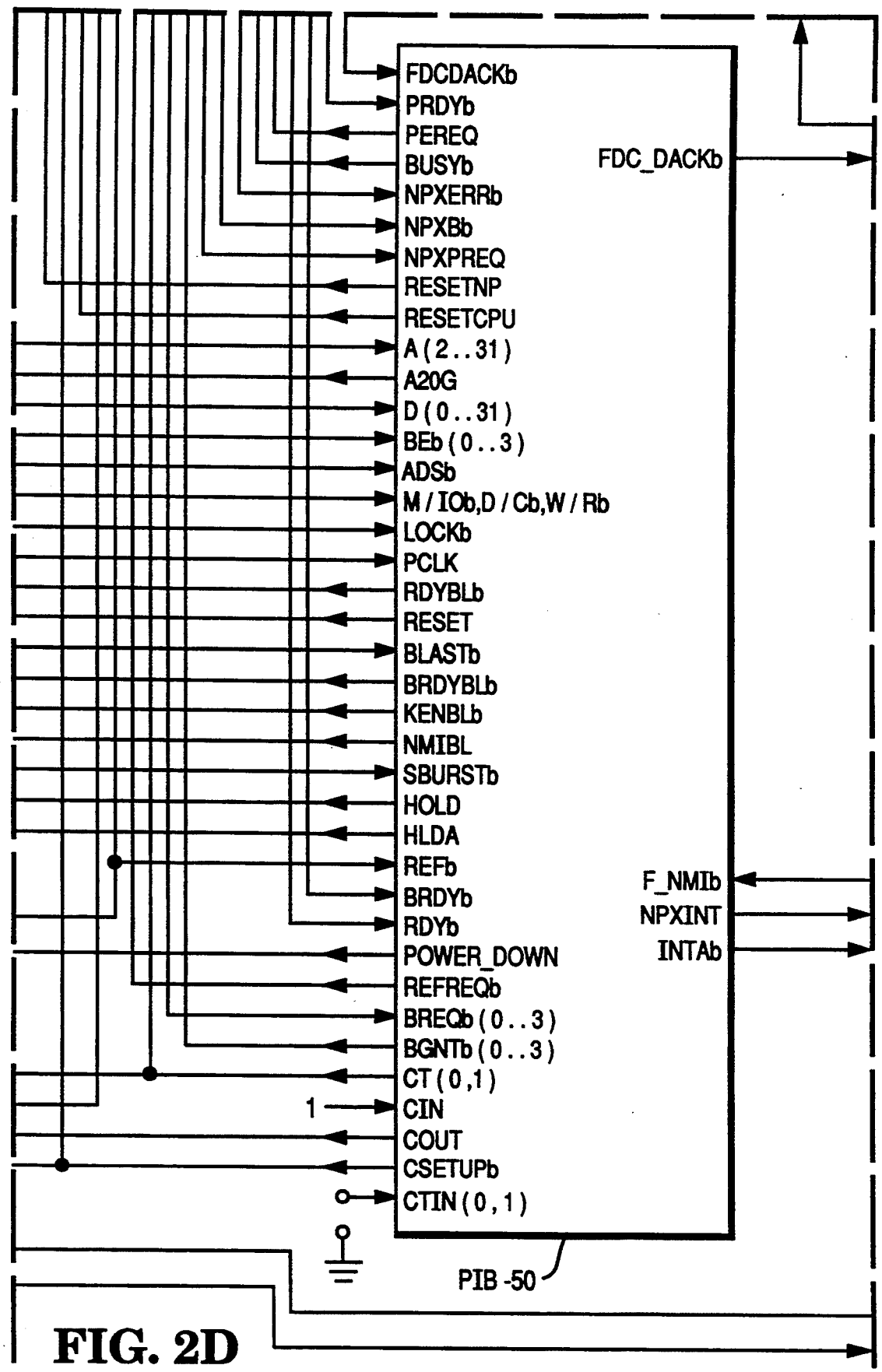

FIG. 1 shows a preferred embodiment of a work station or data processing system according to the invention.

Basically, a CPU 10 communicates through a synchronous local or host P/M bus 20 with functional blocks 30, 40 and 50, and in particular with one or a plurality of bus interface circuits or blocks (BIB) 30 for microchannel access, with one or a plurality of memory interface circuits or blocks (MIB) 40 for memory and cache control and with a local peripheral and videographics array (VGA) interface circuit or block PIB 50. It should be noted that it is possible to provide more than one BIB 30 and more than one MIB 40.

It should be noted that different types of microprocessors may be used for the CPU 10, such as the Intel 80386, 80386SX, and 80486 microprocessors. Also, a coprocessor 12, such as a mathematical coprocessor Intel 80387, or 80387SX, may be added.

The functional blocks 30, 40 and 50 provide an interface between local bus 20 and an asynchronous external bus such as a microchannel 32, memory 42 or various peripheral units. For example, the functional block BIB 30 is provided as an interface between the host P/M bus 20 and microchannel 32. Microchannel 32 is provided with a plurality of slots 32a for attaching conventional adapter boards including adapter boards provided with a microprocessor which may act as a master in communication with other functional blocks of the work station. Furthermore, a control device 32b is connected to the microchannel 32 for controlling a fixed disk drive. A feature of microchannel architecture is that various connected devices, such as device 32b can be a bus master. As a bus master, device 32b controls the asynchronous transfer of data. For example, in the streaming mode, device 32 can place a starting address on microchannel 32 followed by the transmission or reception of consecutive data elements.

The functional block MIB 40 and DRAM memory 42 form a memory unit with MIB 40 forming an interface between the host P/M bus 20 and a DRAM memory 42. DRAM memory 42 may have different sizes with a presently usual size of 16 MB up to 64 MB. Furthermore, MIB 40 controls access to the usual BIOS ROM memory 42a.

Functional peripheral interface block (PIB) 50 forms an interface between the hosts P/M bus 20 and various conventional system and peripheral units. All these units are well known in the art; therefore, they will not be explained in detail.

According to the preferred embodiment each of the functional blocks BIB 30, MIB 40, and PIB 50 has been specifically designed as a single microchip containing all elements such as registers and logic circuitry necessary to establish and perform communication between the host P/M bus 20 and the individual units connected to each functional block 30, 40 and 50.

As indicated in FIG. 1 it should be noted that a number m of BIBs 30 and a number n of MIBs 40 may be provided all connected to the host P/M bus 20. Thus, a large variety of configurations with different CPUs and quite different memory capacities may be implemented. Each chip may be configured quite differently to match various system configurations.

It should be understood that each functional block 30, 40, 50 is provided with some intelligence offering an operation which is relatively independent from the CPU operation generally governing all functions of the system.

Basically, each functional block 30, 40, 50 includes an interface unit between the host P/M bus 20 and an individual internal transaction bus (not shown). Though the timing is based on the CPU clock all operations within the functional block such as read or write operations will be independently performed in one cycle whilst the CPU needs at least two cycles of the CPU clock. Accordingly, this type of system architecture offers a considerably improved performance in view of the reduction in wait states for the CPU resulting in a higher overall operating speed.

The specifically extended host P/M bus 20 of the preferred embodiment of the work station of the invention is illustrated in FIGS. 2A-2E in detail.

Specifically, within the block CPU 10 the conventional input/output ports of a microprocessor as Intel 80386, etc. are listed as address ports A (2, ... 31), data ports D (0, ... 31), byte enable ports BEb (0, ... 3), and an address status output ADSb which indicates that a valid bus cycle definition and address are available and which is driven active in the same clock as the addresses are driven. ADSb is active low. The system clock PCLK timing signal is generated by a clock oscillator 60 (FIG. 2C) and provided to the input port PCLK of the CPU 10 and the functional blocks BIB 30, MIB 40, and PIB 50. These and all other input/output ports of the CPU 10 and the signal presented there are conventional. Thus, they will not be explained in detail.

As may be gathered from FIGS. 2A-2E the functional blocks BIB 30, MIB 40, and PIB 50 are provided with similar input/output ports as the CPU. However, there are several additional ports and associated bus lines connecting corresponding ports of the functional blocks 30, 40, 50 and the CPU 10 with each other.

TABLE 2

PCLK: This clock provides the fundamental timing and the operating frequency for all the functional units which are connected to the host P/M bus. All external timing parameters are specified with respect to the rising edge of PCLK. The clock frequency may range from 16 MHz to 33 MHz according to the specified processor frequency.

A(2:31): These address lines, together with the byte enable lines BE0B-BE3B, define the physical area of memory or input/output space accessed. Address lines A31-A4 are used to drive addresses into the 80486 microprocessor to perform cache line invalidations.

D(0:31): These are the data lines. The lines D0-D7 define the least significant byte of the data bus while lines D24-D31 define the most significant byte of the data bus.

BE(0:3): The byte enable signals indicate active bytes during read and write cycles. BE3b applies to D24-D31, BE2b applies to D16-D23, BE1b applies to D8-D15, and BE0b applies to D0-D7. BE0b -BE3b are active low.

ADSb: The address status output indicates that a valid bus cycle definition and address are available on the cycle definition lines and address bus. ADSb is driven active in the same clock as the addresses are driven. ADSb is active low.

CT(0:1): The combination of the two lines included in the host P/M bus indicates the type of processor (functional block) which may be bus master on the host P/M bus. For example, CT1=1, and CT0=0 may mean that the host CPU 10 is an Intel 40486 processor. It should be noted that the signals on these two lines are transmitted by the PIB 50 to each of any BIBs 30 and MIBs 40.

BREQb(0 ... 3): This is a host P/M bus request signal with the assumption that four BIBs 30 may be provided each being connected with the FIB 50 by one request line.

BGNTb(0 ... 3): This is a host P/M bus grant signal transmitted by the PIB 50 to one of the BIBs 30 having requested access to the host P/M bus by BREQb (0 ... 3).

SBURST(BL)b: This signal is generated by one of the functional blocks BIB 30 of the chip set, specifically one of the BIBs 30 only if the host CPU 10 is currently not bus master, to specify a BURST operation. It is used to temporarily halt the transfer in burst mode but keeps the burst condition established. With this signal the bus master is able to stop the transfer temporarily in burst mode. (Further description see below).

BRDYb(N): This signal indicates that valid data are presented on the data lines in response to a read or the date on the line are accepted in response to a write.

BRDYBLB(N): The burst ready block is the BRDYb signal generated by one of the functional blocks of the chip set.

LOCKb: The bus lock line indicated that the current bus cycle is locked. The processor will not allow a bus hold when LOCKb is asserted. LOCKb goes active in the first clock of the first locked bus cycle and goes inactive after the last clock of the last locked bus cycle. The last locked cycle ends when ready is returned. LOCKb is active low. If CT0 and CT1 are set to 11, (from the PIB 50) then LOCKb is active as long as the system should remain in burst condition. This is used for MCA streaming mode.

In contrast to known systems there are various multiple signals applied to one corresponding port each of the CPU 10 the multiple signals being generated by the BIBs 30 and MIBs 40 if provided in multiplicity. Examples are RDYBLb(N) which is the RDYb (ready) signal generated by one of the functional blocks of the chip set and fed to the RDYb input port of the CPU 10. Similarly, there is a BRDYBLb signal which is the burst ready signal generated by one of the functional blocks of the chip set and fed to the BRDYb input port of the CPU.

As mentioned above in connection with the explanation of the host P/M bus 20 (FIGS. 2A and 2B) the SBURST signal is generated by a BIB having been granted access to the host P/M bus 20. In this case not the host CPU but the BIB is the current bus master. During a burst mode data transmission to a selected MIB 40 in the embodiment according to FIG. 3, the active BIB is able to maintain burst mode access to the host P/M bus 20 despite temporary interruptions in the data transmission. As regards the burst mode operation it should be noted that in contract to a normal read/-write operation where only one address and data stored therein are transmitted in one read/write cycle, the burst mode operation permits consecutive data or command transmission for several addresses without repeatedly requesting access to the host P/M bus 20.

The reason for providing this SBURST feature is that there may be some discontinuity in data flow through the BIB from the microchannel 32 which discontinuity should, however, not result in losing access of the active BIB to the host P/M bus 20.

Figure 3:
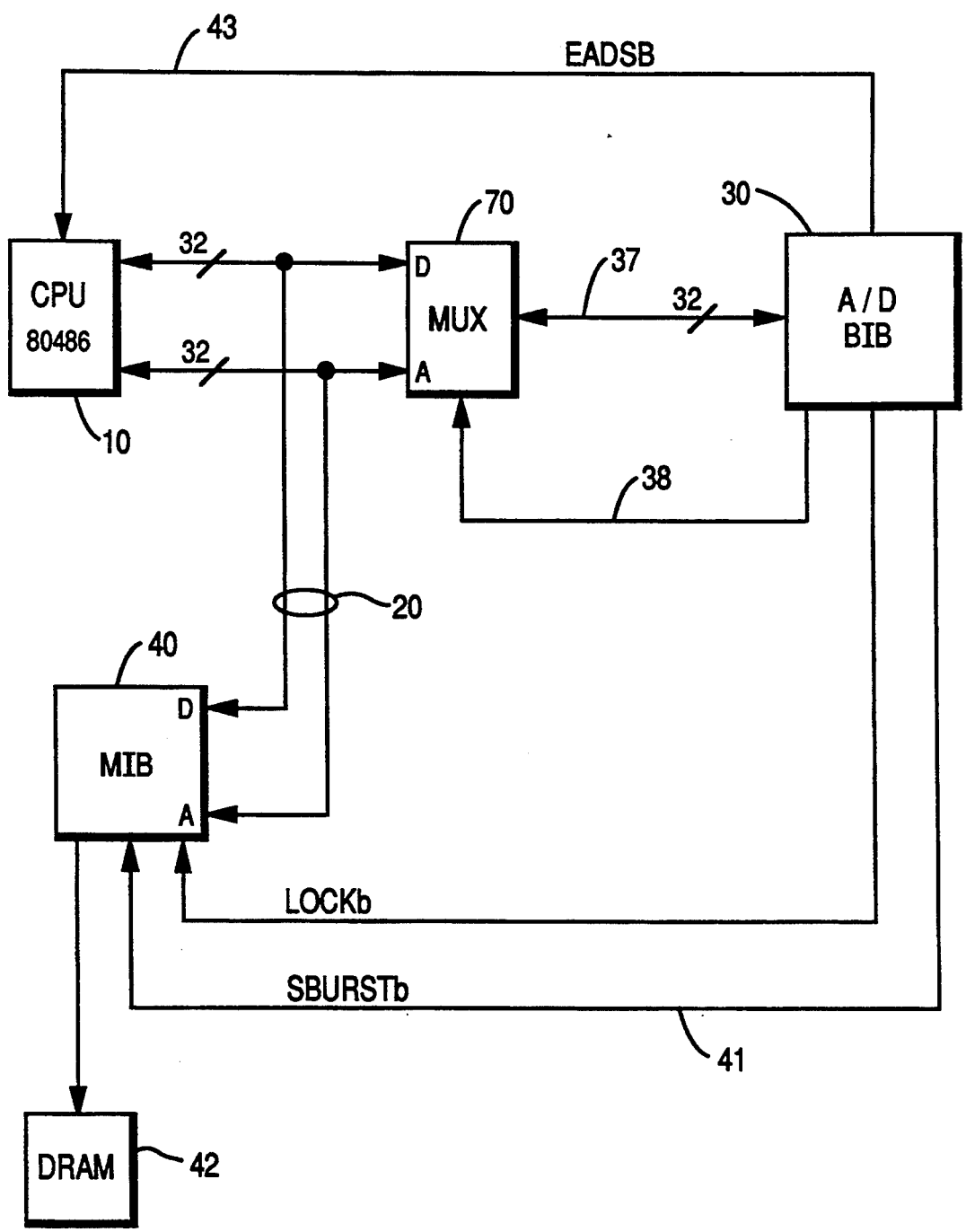
FIG. 3 is a block diagram illustrating the units involved in a burst mode operation according to a salient feature of the present invention.

Referring now to FIGS. 1, 2A-2E and 3 an important feature of the preferred embodiment of the work station according to the invention will be explained, with FIG. 3 showing the functional blocks and units especially involved.

As explained before in connection with FIGS. 1, 2A-2E the host P/M bus 20 comprises a plurality of lines (see FIGS. 2A-2E and Table 1) connected to the respective ports of the CPU 10, for example an Intel microprocessor 80486 and one (or several) MIB(s) 40. Specifically, the host P/M bus 20 includes address lines A2 to A31 and data lines D0 to D31. Therefore, the host P/M bus 20 is adapted for parallel transfer of an address and data with a full width of 32 bits or 4 bytes each.

As a modification of the system shown in FIGS. 1, 2A-2E, the BIB 30 is not directly connected to the host P/M bus 20. As mentioned before, the BIB 30 is implemented as an integrated microchip as shown in FIGS. 6A-6B. As may be seen, all of the pins have a definite assignment with 64 pins assigned to a microchannel connection for a 64-bit or 8-byte parallel data transfer. This reduces the number of pins available for interfacing to the host P/M bus 20. Thus, according to the invention a group of 32 pins, i.e. A/D0 to A/D31 are assigned to transfer alternatively either addresses or data.

In order to match the configuration of the host P/M bus 20 there is provided a multiplexer/demultiplexer 70 which may be implemented in TTL technique, for example as a commercially available 74543 chip.

Basically, the unit MUX 70 has at its one side ports for connection to the group of address lines A0 to A31 and ports for connection to the group of data lines D0 to D31 of the host P/M bus 20 which means that there are in total 64 ports. At the other side, the MUX 70 is provided with 32 ports connected through lines 37 with the 32 pins A/D0 to A/D31 of the BIB 30 (FIGS. 6A-6B) as mentioned before. Note that only address lines A2 to A31 are utilized in the BIB 30.

The MUX 70 acts as a change-over switch, routing an address presented at the ports from the BIB 30 to the group of address lines of the host P/M bus 20, and data presented thereafter by the BIB 30, after switching over under control of a corresponding control signal on line 38, to the group of data lines of the host P/M bus 20.

FIG. 3 shows the SBURSTb line 41 (see Table 1) and an EADSb 43 which are lines of the host P/M bus 20 but shown separately in FIG. 3.

As mentioned before the SBURSTb signal generated by the BIB 30 indicates to the MIB 40 that a continuous data transfer, i.e. for a plurality of addresses is intended.

The EADSb signal indicates to the CPU 10 that there is such a data transfer between the BIB 30 and the MIB 40. Thus, the CPU 10 is able to invalidate any addresses/data contained in internal caches since such data may be changed by the data transfer between BIB 30 and MIB 40 in the DRAM 42.

Referring now to Table 1 and FIGS. 1 to 4, the operation of the work station according to the preferred embodiment of the invention will be explained for the situation that a SBURST write cycle shall be performed with the BIB 30 being the bus master. In such a cycle data will be communicated from the BIB 30 through the MUX 70 to the host P/M bus 20 and received therefrom by the MIB 40 for storage in the DRAM 42.

Figure 4:
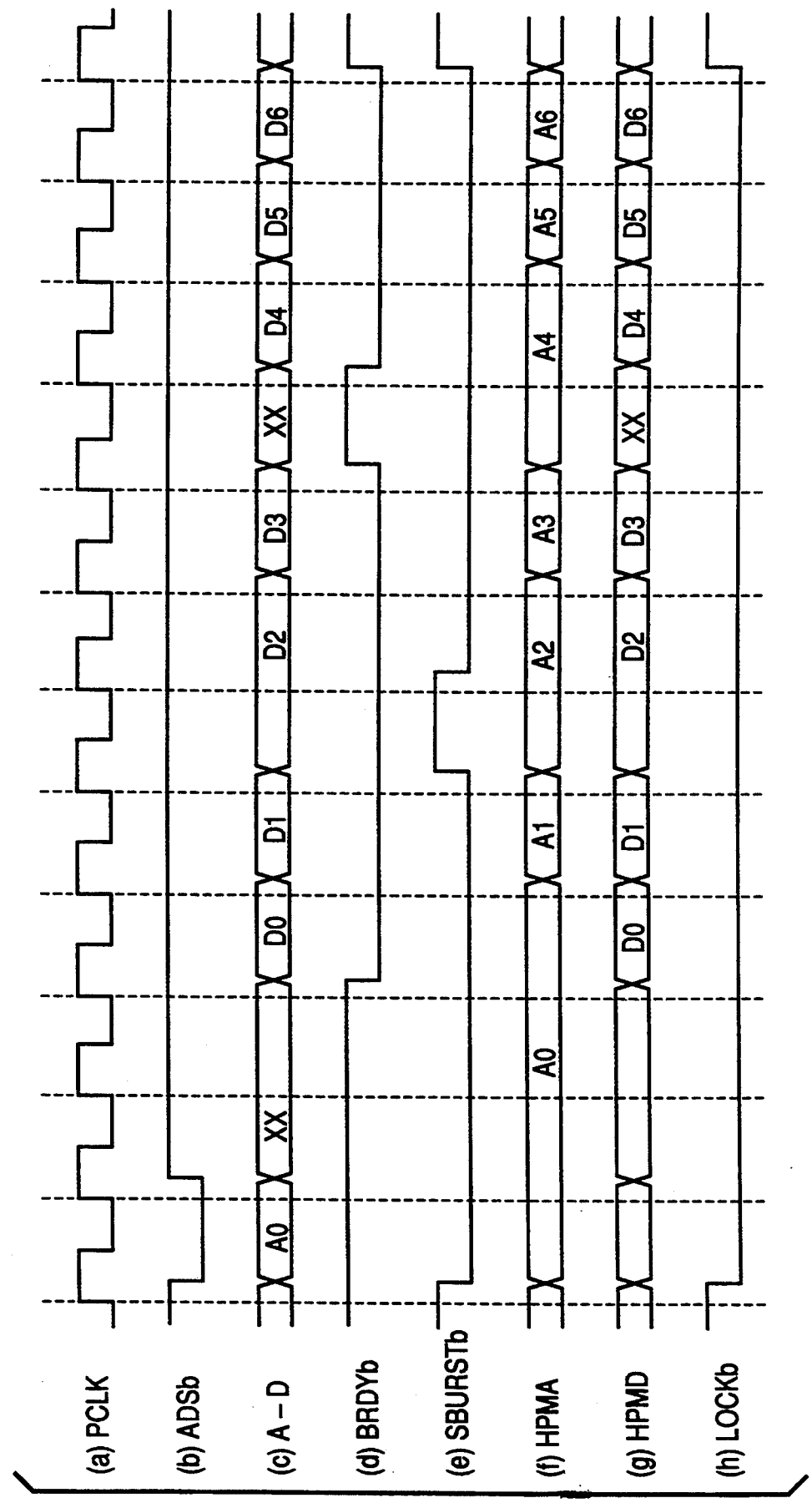
FIG. 4 is a timing diagram used for an explanation of the operation of the work station according to the invention for a burst write cycle.

In FIG. 4, line (a) represents the CPU clock PCLK governing all timing within the system. Consecutive time slots are defined by single clock cycles and are shown between adjacent dotted vertical lines.

As may be gathered from line (c) a first address $A_o$ is presented by the BIB 30 through the MUX 70 to the host P/M bus 20 taking over and holding this address $A_o$ as indicated in line (f) for the host P/M bus address lines (HPMA). ADSb going active low indicates that a first address $A_o$ is presented to the host P/M bus 20. For the next cycle MUX 70 switches to the group of data lines for presenting their data $D_o$ to the host P/M bus 20 as may be seen in the HPMD line (g).

With the SBURSTb signal having gone active low at the beginning of the SBURST write cycle (line (e)) the host P/M bus 20 is locked to the data transfer by signal LOCKb (line (h)) going active low for the whole data transfer period.

It should be noted that no further address is presented by the BIB 30 through the MUX 70. Rather, there is a continuous flow of data D1 ... D6 out of the consecutive addresses following $A_o$ from the BIB 30 through the MUX 70 to the group of data lines for presentation there one after the other for being written via the MIB 40 to the DRAM 42. Consecutive data elements, i.e., data elements with consecutive addresses, are provided in consecutive time slots unless there is a pause or delay in the data transfer, as will be described below.

It should be noted that for this purpose it is the MIB 40 as a slave which calculates the consecutive addresses $A_1 ... A_6$ for respective data $D_1 ... D_6$ as presented on the group of data lines and the group of address lines of the host P/M bus 20 as indicated in HPMD line (g) and HPMA line (f).

Furthermore, a signal generated by the BIB 30 on the line 38 going active low indicates the switching-over of MUX 70 from the address ports to the data ports, maintaining this state for the whole SBURST write cycle.

A further important feature of the present invention may be recognized in the middle portion of FIG. 4 where it is shown that there is some delay or pause in the transfer of data $D_2$, indicated by the SBURST signal going inactive high temporarily, for example if the source is not ready to present data, or the receiver is not ready to receive data. Nevertheless, data transfer is not interrupted but maintained in view of the active LOCKb signal (line (h)).

Signal BRDYb according to line (d) of the host P/M bus 20 goes active low as generated by the MIB 40 indicating that the data $D_o$ on the bus has been accepted. A further situation is indicated in line (c) after $D_3$ with a cycle of invalid data presented causing BRDYb signal (line (d)) going inactive high for one cycle and a delay in presenting $D_4$ on HPMD (line (g)).

Thus, it will be appreciated that by demultiplexing addresses and data and having the MIB 40 as a slave calculate consecutive addresses, a fast data transfer is accomplished in a SBURST write mode without interruption.

Figure 5:
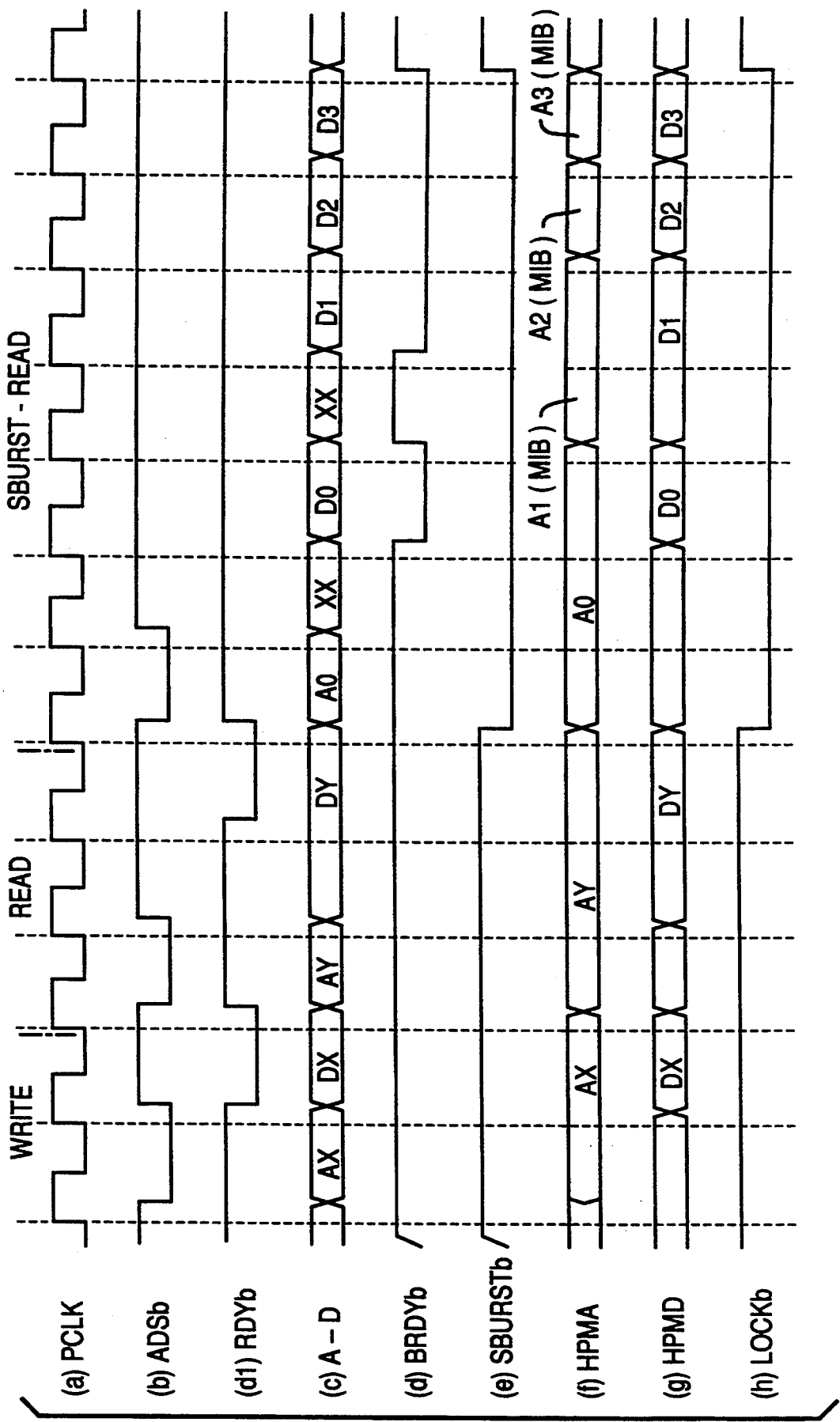
FIG. 5 is a timing diagram used for an explanation of the operation of the work station according to the invention for a burst read cycle.

In FIG. 5 three types of data transfer between the BIB 30 and any other functional block as a MIB 40 are illustrated starting with a single write cycle followed by a single read cycle and with a SBURST read cycle shown in the right-hand part of FIG. 5. Corresponding lines are marked with the same letters as in FIG. 4.

As with the SBURST write cycle (FIG. 4), the BIB 30 in a single write cycle first presents an address $A_x$ to the MUX 70 which is in a position to present this address immediately to the group of address lines of the host P/M bus 20 according to HPMA line (f). With the MUX 70 switched to the group of data ports, data $D_x$ of address $A_x$ is presented to the MUX 70 and further to the group of data lines of the host P/M bus 20 according to the HPMD line (g). Thus, the requested functional block as the MIB 40 is now able to take over both the address $A_x$ and the data $D_x$ from the host P/M bus 20 for writing into the DRAM 42.

As explained with the SBURST write cycle (FIG. 4), the signal ADSb (line (b)) going active low indicates a valid address being presented on the host P/M bus 20 whilst RDYb signal (line ($d_1$)) indicates a valid data transfer for the data $D_x$.

As regards a single read cycle, again the BIB 30 as a bus master presents an address $A_y$ through the MUX 70 to the host P/M bus 20 as indicated in lines (c) and (f). As soon as the associated data $D_y$ is available on the group of data lines of the host P/M bus 20 (line (g)) it is presented to the MIB 30 through the MUX 70 now acting as a multiplexer in reverse direction.

As regards a SBURST read cycle illustrated in FIG. 5, right-hand portion, reference is made first to the description given above in connection with FIG. 4 in respect of the SBURST write cycle.

As may be gathered from FIG. 5, as with a single write cycle first an address $A_o$ is presented through the MUX 70 to the host P/M bus 20 where it is held until the associated data $D_o$ is presented on the group of data lines (line (g)) on the host P/M bus 20 with the SBURSTb signal (line (e)) being active low through the whole SBURST read cycle.

As illustrated in line (f) consecutive addresses $A_1 \ldots A_3$ following $A_o$ are generated by the responding MIB 40 as a slave for fetching further data $D_1 \ldots D_3$ from the DRAM memory through the MIB 40 for presenting them on the group of data lines of the host P/M bus 20 and for receipt by the BIB 30 through the MUX 70 again working as a multiplexer.

In lines (f) and (g) it is shown that there might be an extension of the cycle as indicated for $A_1/D_1$ for a time where the BRDYb signal temporarily changed to an inactive high. Data transfer will not be interrupted despite this halt of the cycle since the LOCKb signal (line (h)) stays active low over the entire SBURST read cycle.

Of course, both the SBURST write cycle and the SBURST read cycle are performed without involving the CPU 10 which may do other tasks in this time.

As a further important feature of the present invention it should be noted that in connection with the request/grant procedure of the BIB 30 the bus master function is transferred from the CPU 10 to the BIB 30 which is indicated by a dynamic change of the CT (0 . . . 1) signal (FIG. 2) to "11" presented to the MIBs 40 and the BIBs 30 as single CT(0 . . . 1).

With the work station of the preferred embodiment each functional block is implemented by a single microchip, preferably formed in HCMOS technique. Each microchip comprises all sub-units, such as registers and logic circuitry, required. Though the chips are standardized they may be used in a variety of system configurations since they include ample register space for configuration data such as type of CPU, operating frequency, DRAM memory space, etc.

Specifically, according to one aspect of the invention, the shortage of pins available for data transfer is overcome by the use of a multiplexer/demultiplexer, such as MUX 70.

As an example, the chip may be implemented in an ASIC package using 208 pins which may be easily placed on the system board of the work station. FIGS. 6A–6B show a plan view of the BIB ASIC package with pin assignment.

The detail design of the present invention is captured in CDL, a high level hardware description language. CDL is a software tool which unambiguously defines the hardware for a digital logic system. The following CDL listing in Table 2 is an example of the implementation of the relevant part of the preferred embodiments of the work station of this invention. The listing may be compiled to generate a "C" source code which may then be compiled by a C compiler to generate a standardized C object file format. A logic synthesis program is available from the attached CDL listing.

It will be clear to those skilled in the art that the present invention is not limited to the specific embodiment disclosed and illustrated herein. Nor is the invention limited to applications employing 386, 386SX of 486 processors.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A work station comprising:
   a central processing unit (CPU);
   a memory unit;
   a first interface circuit connected between an external bus and said CPU, said external bus being connected to a device which controls an asynchronous transfer of a starting address and consecutive data elements to said external bus, said first interface circuit enabling data transfer between said external bus and said memory unit;

a system clock providing a timing signal to said CPU and said first interface circuit, said timing signal defining consecutive time slots, each time slot equal to a single clock cycle; and a local bus connecting said interface circuit, CPU and memory unit;

wherein said local bus includes a control line group for controlling the transfer, over said local bus, of the starting address in a first time slot and consecutive data elements in consecutive time slots;

a plurality of additional first interface circuits connected respectively between a plurality of microchannel busses and said local bus; and a plurality of second interface circuits connected respectively between a plurality of memories and said local bus;

wherein each of said first and second interface circuits is designed as a self-contained functional block formed as an integrated circuit chip; and said local bus including lines connecting each of said plurality of first and second interface circuits with an arbitrator, respective lines transmitting a local bus access request from respective interface circuits to said arbitrator, and other lines transmitting a local bus granting signal from the arbitrator to a selected one of said plurality of interface circuits.

2. A work station comprising:

a central processing unit (CPU);

a memory connected to a memory interface circuit; a device connected to a microchannel bus for controlling asynchronous transfer of an address and consecutive data elements to said microchannel bus;

a bus interface circuit, connected between said microchannel bus and CPU, enabling data transfer between said device and said memory unit;

a system clock providing a timing signal to said CPU and first interface circuit, said timing signal defining consecutive time slots, each time slot equal to a single clock cycle; and a local bus connecting said interface circuits, CPU and memory unit;

wherein said local bus includes a control line group for controlling the transfer, over said local bus, of a starting address in a first time slot and consecutive data elements in consecutive time slots, said control line group including:

a BURST line for presenting a BURST signal generated by said bus interface circuit as a bus master and received by said memory interface circuit as a slave indicating a continuous data transfer (burst mode) to follow;

a LOCK line for locking said local bus for said continuous data transfer for the duration of the burst mode;

an EADS line for transmitting a signal from said first interface circuit to said CPU indicating a burst mode data transfer between said bus interface circuit and said memory interface circuit and adapted to invalidate any data contained in a cache memory of said CPU;

wherein an active to inactive transition of said BURST signal temporarily halts a transfer of data in the burst mode whilst maintaining a communication between said bus master and said slave; and a multiplexer/demultiplexer connected on one side to said bus interface circuit and on the other side to both an address line group and a data line group of said local bus;

a control line extending between said bus interface circuit and said multiplexer/demultiplexer;

wherein said multiplexer/demultiplexer is switched from said address line group to said data line group under control of said bus interface circuit through said control line.

3. The work station of claim 2 further comprising:

a plurality of bus interface circuits connected respectively between a plurality of microchannel busses and said local bus; and a plurality of memory interface circuits connected respectively between a plurality of memories and said local bus;

wherein each of said bus and memory interface circuits is designed as a self-contained functional block formed as an integrated circuit chip; and wherein said local bus includes lines connecting each of said plurality of bus and memory interface circuits with an arbitrator, respective lines transmitting a local bus access request from respective interface circuits to said arbitrator, and other lines transmitting a local bus granting signal from the arbitrator to a selected one of said plurality of interface circuits.

4. A work station comprising:

a central processing unit (CPU);

a memory unit;

a first interface circuit connected between an external bus and said CPU, said external bus being connected to a device which controls an asynchronous transfer of a starting address and consecutive data elements to said external bus, said first interface circuit enabling data transfer between said external bus and said memory unit, said interface circuit being designed as a self-contained functional block formed as an integrated circuit chip and provided with a predetermined number of connecting pins, a group thereof being assigned for communicating either addresses or data;

a system clock providing a timing signal to said CPU and said first interface circuit, said timing signal defining consecutive time slots, each time slot equal to a single clock cycle;

a local bus connecting said interface circuit, CPU and memory unit said local bus including a control line group for controlling the transfer, over said local bus, of the starting address in a first time slot and consecutive data elements in consecutive time slots; said local bus further including both an address line group and a data line group each corresponding in number to said group of connecting pins of said interface circuit and a multiplexer/demultiplexer connected on one side to said group of pins of said interface circuit and on the other side to both said address line group and said data line group.

5. The work station of claim 4 further comprising:

a control line extending between said interface circuit and multiplexer/demultiplexer;

wherein said multiplexer/demultiplexer is switched from said address line group to said data line group under control of said interface circuit through said control line.

6. The work station of claim 4, wherein said local bus includes lines connected between said CPU and first interface circuit for dynamically changing a bus master function from one to the other.

7. The work station of claim 4 wherein said memory unit includes a memory, and a second interface circuit connected between said local bus and memory.

8. The work station of claim 7, wherein said control line group includes a BURST line for presenting a BURST signal generated by said first interface circuit as a bus master and received by said second interface circuit as a slave indicating a continuous data transfer (burst mode) to follow.

9. The work station of claim 8, wherein said control line group further includes a LOCK line for locking said local bus for said continuous data transfer for the duration of the burst mode.

10. The work station of claim 8, wherein said control line group further includes an EADS line for transmitting a signal from said first interface circuit to said CPU indicating a burst mode data transfer between said first interface circuit and said second interface circuit and adapted to invalidate any data contained in a cache memory of said CPU.

11. The work station of claim 8, wherein said external bus is a microchannel bus, and wherein an active to inactive transition of said BURST signal temporarily halts a transfer of data in the burst mode whilst maintaining a communication between said bus master and said slave.

12. A method of transferring data between first and second units of a work station, said units being connected by a local bus, comprising the steps of:
providing a timing signal which defines consecutive single clock cycle time slots;
transmitting a BURST signal on said local bus from a first to a second unit indicating a continuous data transfer;
generating a LOCK signal on said local bus for locking said bus for continuous data transfer;
presenting a starting address on said bus by said first unit;
providing data in consecutive time slots from said first unit to said local bus, said data corresponding to said starting address and consecutive addresses;
calculating said consecutive addresses in said second unit receiving said data and
wherein said local bus has a group of address lines and a parallel group of data lines, said first unit having fewer input/output ports assigned to data-/address transfer than the sum of said address and data lines, and wherein said data is provided by said first unit at the same ports as said starting address and is demultiplexed to said data lines of said local bus.

13. The method of claim 12 further comprising:
generating a signal indicating the presence of said starting address on said bus.

14. The method of claim 12 further comprising:
removing said BURST signal while maintaining said LOCK signal on said bus to pause said data transfer.

15. The method of claim 12, wherein said data is provided by said second unit onto the data lines of said local bus, said data being multiplexed to the same ports of said first unit used for presenting said starting address to said local bus.

16. The method of claim 12 further comprising:
providing a BRDY signal on said bus from said second unit indicating said second unit is ready to receive data.

17. The method of claim 16 further comprising:
removing said BRDY signal to pause said data transfer.

* * * * *